United States Patent
Zucker

(10) Patent No.: US 12,496,141 B2
(45) Date of Patent: Dec. 16, 2025

(54) SYSTEMS AND METHODS FOR WORK VOLUME MAPPING TO FACILITATE DYNAMIC COLLISION AVOIDANCE

(71) Applicant: Mazor Robotics Ltd., Caesarea (IL)

(72) Inventor: Ido Zucker, Tel Aviv (IL)

(73) Assignee: Mazor Robotics Ltd., Caesarea (IL)

( * ) Notice: Subject to any disclaimer, the term of this patent is extended or adjusted under 35 U.S.C. 154(b) by 694 days.

(21) Appl. No.: 17/482,301

(22) Filed: Sep. 22, 2021

(65) Prior Publication Data

US 2023/0096023 A1 Mar. 30, 2023

(51) Int. Cl.
*A61B 34/20* (2016.01)
*A61B 34/00* (2016.01)
*A61B 34/30* (2016.01)
*G06N 20/00* (2019.01)

(52) U.S. Cl.
CPC .............. *A61B 34/20* (2016.02); *A61B 34/30* (2016.02); *A61B 34/77* (2016.02); *G06N 20/00* (2019.01); *A61B 2034/2065* (2016.02)

(58) Field of Classification Search
CPC ......... A61B 34/20; A61B 34/30; A61B 34/77; A61B 2034/2065; A61B 34/32; A61B 90/361; A61B 2017/00216; A61B 2034/2051; A61B 2034/2055; G06N 20/00; G06N 7/01; B25J 9/1689; B25J 9/1676; G05B 2219/45123
See application file for complete search history.

(56) References Cited

U.S. PATENT DOCUMENTS

| | | | |
|---|---|---|---|
| 11,016,491 B1* | 5/2021 | Millard | G06N 3/045 |
| 11,810,365 B1* | 11/2023 | Crego | G06V 20/58 |
| 2004/0249508 A1 | 12/2004 | Suita et al. | |
| 2014/0371577 A1* | 12/2014 | Maillet | A61B 17/00234 600/424 |
| 2017/0190051 A1 | 7/2017 | O'Sullivan et al. | |
| 2017/0334066 A1 | 11/2017 | Levine et al. | |
| 2018/0263714 A1 | 9/2018 | Kostrzewski et al. | |
| 2019/0000569 A1 | 1/2019 | Crawford et al. | |
| 2020/0046439 A1* | 2/2020 | Tekiela | A61B 34/74 |
| 2020/0211217 A1 | 7/2020 | Cairl | |
| 2021/0093407 A1* | 4/2021 | Fredrickson | A61B 34/74 |
| 2022/0126451 A1* | 4/2022 | Hopkinson | B25J 13/08 |

(Continued)

FOREIGN PATENT DOCUMENTS

| WO | WO 2013/101273 | 7/2013 |
|---|---|---|
| WO | WO 2019/204013 | 10/2019 |

OTHER PUBLICATIONS

International Search Report and Written Opinion for International (PCT) Patent Application No. PCT/IL2022/051006, dated Jan. 5, 2023, 17 pages.

*Primary Examiner* — Abby Lin
*Assistant Examiner* — Danielle M Jackson
(74) *Attorney, Agent, or Firm* — Sheridan Ross P.C.

(57) ABSTRACT

A system according to at least one embodiment of the present disclosure includes a processor; and a memory coupled with the processor and including data stored thereon that, when processed by the processor, enables the processor to: predict, at a first time, a motion of an object during a surgical procedure and at a second time following the first time; and update, based on the predicted motion of the object, a surgical navigation path of a robotic arm.

18 Claims, 7 Drawing Sheets

(56) References Cited

U.S. PATENT DOCUMENTS

| | | | |
|---|---|---|---|
| 2022/0280238 A1* | 9/2022 | Fuerst | A61B 34/20 |
| 2022/0288781 A1* | 9/2022 | Schoessler | B25J 9/1651 |
| 2023/0302650 A1* | 9/2023 | Goldberg | A61B 34/35 |

* cited by examiner

SYSTEMS AND METHODS FOR WORK VOLUME MAPPING TO FACILITATE DYNAMIC COLLISION AVOIDANCE

FIELD

The present technology generally relates to surgical navigation, and relates more particularly to navigation of surgical robots.

BACKGROUND

Surgical robots may assist a surgeon or other medical provider in carrying out a surgical procedure, or may complete one or more surgical procedures autonomously. Imaging may be used by a medical provider for diagnostic and/or therapeutic purposes or to detect components in a surgical setting. A robotic arm may move within the confines of a surgical setting.

SUMMARY

Example aspects of the present disclosure include:

A system according to at least one embodiment of the present disclosure comprises: a processor; and a memory coupled with the processor and comprising data stored thereon that, when processed by the processor, enables the processor to: predict, at a first time, a motion of an object during a surgical procedure and at a second time following the first time; and update, based on the predicted motion of the object, a surgical navigation path of a robotic arm.

Any of the aspects herein, wherein the predicted motion is based on one or more of a type of surgeon, a surgeon performing a surgery, a type of surgical procedure, a time of day, a patient position, a surgical room, and a duration of a surgery.

Any of the aspects herein, wherein the data comprises a machine learning model, and wherein the predicted motion is based on the machine learning model processing sensor input received during the surgical procedure.

Any of the aspects herein, wherein the data, when processed by the processor, further enables the processor to: generate a three-dimensional (3D) map of a working volume proximate at least one of a patient and a surgeon.

Any of the aspects herein, wherein the map comprises a heat map with at least one sub-volume to be avoided by the robotic arm.

Any of the aspects herein, wherein the at least one sub-volume is determined based on the predicted motion of the object.

Any of the aspects herein, wherein the at least one sub-volume comprises a high probability zone that is defined based on the predicted motion of the object.

Any of the aspects herein, wherein a first surgical navigation path of the robot at the first time passes through the first sub-volume, and wherein the updated surgical navigation path avoids passing through the first sub-volume.

Any of the aspects herein, wherein the predicted motion is based on sensor input received from at least one of an imaging sensor and a depth sensor.

A method according to at least one embodiment of the present disclosure comprises: receiving, from a first sensor, data comprising information related to a motion of an object at a first time; predicting, at the first time, a position of an object at a second time later than the first time; and updating, based on the predicted motion of the object, a surgical navigation path of a robotic arm.

Any of the aspects herein, wherein the predicted motion is based on one or more of a type of surgery, a surgeon performing a surgery, a type of surgical procedure, a time of day, a patient position, a surgical room, and a duration of a surgery.

Any of the aspects herein, wherein the data comprises a machine learning model, and wherein the predicted motion of the object at the second time is based on the machine learning model processing the data from the first sensor.

Any of the aspects herein, wherein the method further comprises: generating a three-dimensional (3D) map of a working volume proximate at least one of a patient and a surgeon.

Any of the aspects herein, wherein the 3D map comprises a heat map with at least a first sub-volume to be avoided by the robotic arm and a second sub-volume that the robotic arm passes through.

Any of the aspects herein, wherein the first sub-volume is at least partially contained within the second sub-volume.

Any of the aspects herein, further comprising: halting a movement of the robotic arm when the robotic arm is within a threshold distance of the first sub-volume.

Any of the aspects herein, wherein the first sub-volume is at least partially determined by the predicted motion of the object.

Any of the aspects herein, wherein the first sensor is at least one of an imaging sensor and a depth sensor.

A system according to at least one embodiment of the present disclosure comprises: a processor; a first robotic arm; and a memory coupled with the processor and comprising data stored thereon that, when processed by the processor, enables the processor to: determine, at a first time, a first position of an object during a surgical procedure; predict, at the first time and based on the first position of the object, a second position of the object at a second time; and update, based on the predicted second position of the object, a surgical navigation path of the first robotic arm.

Any of the aspects herein, wherein the data further enables the processor to: register one or more portions of the object to the first robotic arm.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
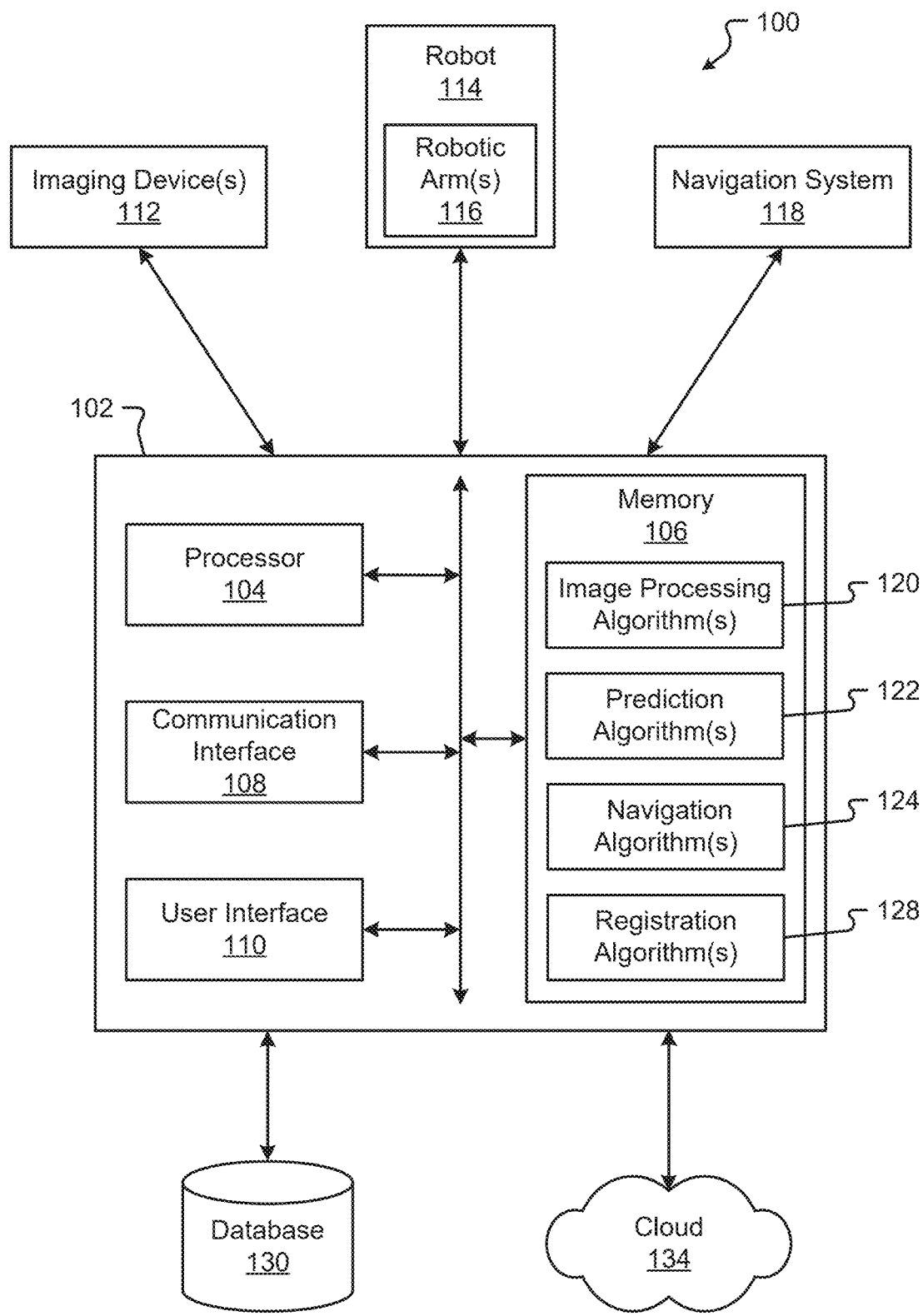
FIG. 1 is a block diagram of a system in accordance with at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Alternatively or additionally, functions may be implemented using machine learning models, neural networks, artificial neural networks, or combinations thereof (alone or in combination with instructions). Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia Geforce RTX 2000-series processors, Nvidia Geforce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The terms proximal and distal are used in this disclosure with their conventional medical meanings, proximal being closer to the operator or user of the system, and further from the region of surgical interest in or on the patient, and distal being closer to the region of surgical interest in or on the patient, and further from the operator or user of the system.

During robotic surgery or surgical procedures, a robotic arm and a surgeon may share a working space around a patient. The robotic arm may have a proximity sensor or a force gauge that may stop or move the robotic arm (1) when the robotic arm collides with an object, or (2) when the robotic arm is close to an object. Similarly, a depth camera may determine that the robotic arm is contacting or close to another object and may cause the robotic arm to stop to prevent collision.

According to at least one embodiment of the present disclosure, a system may predict the position of a user (e.g., a surgeon) prior to calculating a navigation path for a robotic arm. The path may be dynamically altered and react to user movement to avoid collision. In some embodiments, the system may comprise a depth camera or other imaging device capable of tracking the position of the user in real-time or near real-time. The system may be configured to create three dimensional (3D) maps of a working area, and may further divide the working area into sections that are determined based on the likeliness of user movement relative to the section (e.g., likeliness the user enters the section, likeliness the user leaves the section, likeliness the user moves within the section, etc.).

In some embodiments, the 3D maps may take into account biomechanical considerations, such as defining a distance from a non-moving user as being safe (e.g., a distance outside of an arm's length away from the non-moving user in any direction may be defined as safe for the robot to move through). In some embodiments, the system may construct or build kinetic models of the user or multiple users (e.g., the camera may track nodes associated with joints of the user or multiple users to determine general movements of the user or multiple users) to predict the movement (e.g., an arm movement, a movement from a first section of the working area to a second different section of the working area) of the user or multiple users. In at least one embodiment, the system may use the predictions of user movement to build navigation paths for the robotic arm (or, more generally, other moving components within the system) that avoids high traffic areas (e.g., areas where multiple users are present, areas in which there is a strong likelihood that the user's arm will be positioned, etc.) and/or that changes the movement speed of the robotic arm. Additionally or alternatively, the navigation paths may be adjusted based on user movement and/or predicted user movement in real time to avoid collision.

Embodiments of the present disclosure provide technical solutions to one or more of the problems of (1) slow or low-efficiency navigation updating, and (2) collisions during surgery or surgical procedures.

Turning first to FIG. 1, a block diagram of aspects of a system 100 according to at least one embodiment of the present disclosure is shown. The system 100 may be used to control and navigate a robotic arm or other surgical device based on predicted user movement; provide real-time navigation of a robotic arm to avoid high traffic areas; map areas of a working volume and predicted user movement and control the robotic arm based on the mapped areas; and/or carry out one or more other aspects of one or more of the methods disclosed herein. The system 100 comprises a computing device 102, one or more imaging devices 112, a robot 114, a navigation system 118, a database 130, and/or a cloud or other network 134. Systems according to other embodiments of the present disclosure may comprise more or fewer components than the system 100. For example, the system 100 may not include the imaging device 112, the robot 114, one or more components of the computing device 102, the database 130, and/or the cloud 134.

The computing device 102 comprises a processor 104, a memory 106, a communication interface 108, and a user interface 110. Computing devices according to other embodiments of the present disclosure may comprise more or fewer components than the computing device 102.

The processor 104 of the computing device 102 may be any processor described herein or any similar processor. The processor 104 may be configured to execute instructions stored in the memory 106, which instructions may cause the processor 104 to carry out one or more computing steps utilizing or based on data received from the imaging device 112, the robot 114, the navigation system 118, the database 130, and/or the cloud 134.

The memory 106 may be or comprise RAM, DRAM, SDRAM, other solid-state memory, any memory described herein, or any other tangible, non-transitory memory for storing computer-readable data and/or instructions. The memory 106 may store information or data useful for completing, for example, any step of the method 400 described herein, or of any other method. The memory 106 may store, for example, one or more image processing algorithms 120, one or more prediction algorithms 122, one or more navigation algorithms 124, and/or one or more registration algorithms 128. Additionally or alternatively, one or more of the algorithms discussed herein (e.g., prediction algorithms 122) may be provided as a prediction model (i.e., a model trained on surgical data that receives real-time or near real-time inputs and outputs movement predictions based thereon). The prediction model may be, for example, artificial intelligence models, Machine Learning models, Convolutional Neural Network (CNN) models, combinations thereof, and/or the like. The prediction model may be trained on surgical data related to one or more parameters (e.g., type of surgery, type of surgeon, type of surgical procedure, time of day, patient position, information associated with the patient, surgical room, surgical team, duration of surgery, etc.) that may be relevant to the surgery or surgical procedure in which the prediction model is used. For instance, the prediction model may be trained on data related to previous surgeries of a first surgeon, and the prediction model may be implemented during a surgery or surgical procedure conducted by the first surgeon.

In some embodiments, the prediction model may return a confidence score along with the prediction. The confidence score may be or comprise a quantitative indicator (e.g., a value, a percent, etc.) that reflects the overall level of certainty of the predicted movement. In some embodiments, the system 100 may implement one or more prediction models trained on different data sets and may use the prediction model yielding the highest confidence score in predicting the movement of the user.

Such instructions or algorithms may, in some embodiments, be organized into one or more applications, modules, packages, layers, or engines. Alternatively or additionally, the memory 106 may store other types of data (e.g., machine learning models, artificial neural networks, etc.) that can be processed by the processor 104 to carry out the various methods (e.g., a method 400) and features described herein. Thus, although various components of memory 106 are described as instructions, it should be appreciated that functionality described herein can be achieved through use of instructions, algorithms, and/or machine learning models. The data, algorithms, and/or instructions may cause the processor 104 to manipulate data stored in the memory 106 and/or received from or via the imaging device 112, the robot 114, the database 130, and/or the cloud 134.

The computing device 102 may also comprise a communication interface 108. The communication interface 108 may be used for receiving image data or other information from an external source (such as the imaging device 112, the robot 114, the navigation system 118, the database 130, the cloud 134, and/or any other system or component not part of the system 100), and/or for transmitting instructions, images, or other information to an external system or device (e.g., another computing device 102, the imaging device 112, the robot 114, the navigation system 118, the database 130, the cloud 134, and/or any other system or component not part of the system 100). The communication interface 108 may comprise one or more wired interfaces (e.g., a USB port, an Ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The computing device 102 may also comprise one or more user interfaces 110. The user interface 110 may be or comprise a keyboard, mouse, trackball, monitor, television, screen, touchscreen, and/or any other device for receiving information from a user and/or for providing information to a user. The user interface 110 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 110 may be useful to allow a surgeon or other user to modify instructions to be executed by the processor 104 according to one or more embodiments of the present disclosure, and/or to modify or adjust a setting of other information displayed on the user interface 110 or corresponding thereto.

Although the user interface 110 is shown as part of the computing device 102, in some embodiments, the computing device 102 may utilize a user interface 110 that is housed separately from one or more remaining components of the computing device 102. In some embodiments, the user interface 110 may be located proximate one or more other components of the computing device 102, while in other embodiments, the user interface 110 may be located remotely from one or more other components of the computer device 102.

The imaging device 112 may be operable to image anatomical feature(s) (e.g., a bone, veins, tissue, etc.) and/or other aspects of patient anatomy to yield image data (e.g., image data depicting or corresponding to a bone, veins, tissue, etc.). "Image data" as used herein refers to the data generated or captured by an imaging device 112, including in a machine-readable form, a graphical/visual form, and in any other form. In various examples, the image data may comprise data corresponding to an anatomical feature of a patient, or to a portion thereof. The image data may be or comprise a preoperative image, an intraoperative image, a postoperative image, or an image taken independently of any surgical procedure. In some embodiments, a first imaging device 112 may be used to obtain first image data (e.g., a first image) at a first time, and a second imaging device 112 may be used to obtain second image data (e.g., a second image) at a second time after the first time. The imaging device 112 may be capable of taking a two dimensional (2D) image or a 3D image to yield the image data. The imaging device 112 may be or comprise, for example, an ultrasound scanner (which may comprise, for example, a physically separate transducer and receiver, or a single ultrasound transceiver), an O-arm, a C-arm, a G-arm, or any other device utilizing X-ray-based imaging (e.g., a fluoroscope, a CT scanner, or other X-ray machine), a magnetic resonance imaging (MRI) scanner, an optical coherence tomography (OCT) scanner, an endoscope, a microscope, an optical camera, a thermographic camera (e.g., an infrared camera), a radar system (which may comprise, for example, a transmitter, a receiver, a processor, and one or more antennae), or any other imaging device 112 suitable for obtaining images of an anatomical feature of a patient. The imaging device 112 may be contained entirely within a single housing, or may comprise a transmitter/emitter and a receiver/detector that are in separate housings or are otherwise physically separated.

In some embodiments, the imaging device 112 may be or comprise one or more depth sensors, cameras, or tracking devices. The depth sensors may track the position of one or more users (e.g., one or more surgeons, one or more members of a surgical staff, a patient, etc.) within the context of a surgical environment (e.g., an operating room, an exam room during a surgical procedure, etc.), and may relay the information related to the position of the one or more users to one or more components of the system 100 (e.g., the computing device 102, the navigation system 118, etc.). In one embodiment, the depth sensors may track one or more portions of the user (e.g., the arms of the user, the hands of the user, etc.) using, for example, a kinetic skeleton model to track the joints of the user and the movements thereof.

In some embodiments, the imaging device 112 may comprise more than one imaging device 112. For example, a first imaging device may provide first image data and/or a first image, and a second imaging device may provide second image data and/or a second image. In still other embodiments, the same imaging device may be used to provide both the first image data and the second image data, and/or any other image data described herein. The imaging device 112 may be operable to generate a stream of image data. For example, the imaging device 112 may be configured to operate with an open shutter, or with a shutter that continuously alternates between open and shut so as to capture successive images. For purposes of the present disclosure, unless specified otherwise, image data may be considered to be continuous and/or provided as an image data stream if the image data represents two or more frames per second.

The robot 114 may be any surgical robot or surgical robotic system. The robot 114 may be or comprise, for example, the Mazor X™ Stealth Edition robotic guidance system. The robot 114 may be configured to position the imaging device 112 at one or more precise pose(s) (i.e., position(s) and orientation(s)), and/or to return the imaging device 112 to the same pose(s) at a later point in time. The robot 114 may additionally or alternatively be configured to manipulate a surgical tool (whether based on guidance from the navigation system 118 or not) to accomplish or to assist with a surgical task. In some embodiments, the robot 114 may be configured to hold and/or manipulate an anatomical element during or in connection with a surgical procedure. The robot 114 may comprise one or more robotic arms 116. In some embodiments, the robotic arm 116 may comprise a first robotic arm and a second robotic arm, though the robot 114 may comprise more than two robotic arms. In some embodiments, one or more of the robotic arms 116 may be used to hold and/or maneuver the imaging device 112. In embodiments where the imaging device 112 comprises two or more physically separate components (e.g., a transmitter and receiver), one robotic arm 116 may hold one such component, and another robotic arm 116 may hold another such component. Each robotic arm 116 may be positionable independently of the other robotic arm. The robotic arms may be controlled in a single, shared coordinate space, or in separate coordinate spaces.

The robot 114, together with the robotic arm 116, may have, for example, one, two, three, four, five, six, seven, or more degrees of freedom. Further, the robotic arm 116 may be positioned or positionable in any pose, plane, and/or focal point. The pose includes a position and an orientation. As a result, an imaging device 112, surgical tool, or other object held by the robot 114 (or, more specifically, by the robotic arm 116) may be precisely positionable in one or more needed and specific positions and orientations.

The robotic arm(s) 116 may comprise one or more sensors that enable the processor 104 (or a processor of the robot 114) to determine a precise pose in space of the robotic arm (as well as any object or element held by or secured to the robotic arm).

In some embodiments, reference markers (i.e., navigation markers) may be placed on the robot 114 (including, e.g., on the robotic arm 116), the imaging device 112, or any other object in the surgical space. The reference markers may be tracked by the navigation system 118, and the results of the tracking may be used by the robot 114 and/or by an operator of the system 100 or any component thereof. In some embodiments, the navigation system 118 can be used to track other components of the system (e.g., imaging device 112) and the system can operate without the use of the robot 114 (e.g., with the surgeon manually manipulating the imaging device 112 and/or one or more surgical tools, based on information and/or instructions generated by the navigation system 118, for example).

The navigation system 118 may provide navigation for a surgeon and/or a surgical robot during an operation. The navigation system 118 may be any now-known or future-developed navigation system, including, for example, the Medtronic StealthStation™ S8 surgical navigation system or any successor thereof. The navigation system 118 may include one or more cameras or other sensor(s) for tracking one or more reference markers, navigated trackers, or other objects within the operating room or other room in which some or all of the system 100 is located. The one or more cameras may be optical cameras, infrared cameras, or other cameras. In some embodiments, the navigation system may comprise one or more electromagnetic sensors. In various embodiments, the navigation system 118 may be used to track a position and orientation (i.e., pose) of the imaging device 112, the robot 114 and/or robotic arm 116, and/or one or more surgical tools (or, more particularly, to track a pose of a navigated tracker attached, directly or indirectly, in fixed relation to the one or more of the foregoing). The navigation system 118 may include a display for displaying one or more images from an external source (e.g., the computing device 102, imaging device 112, or other source) or for displaying an image and/or video stream from the one or more cameras or other sensors of the navigation system 118. In some embodiments, the system 100 can operate without the use of the navigation system 118. The navigation system 118 may be configured to provide guidance to a surgeon or other user of the system 100 or a component thereof, to the robot 114, or to any other element of the system 100 regarding, for example, a pose of one or more anatomical elements, whether or not a tool is in the proper trajectory, and/or how to move a tool into the proper trajectory to carry out a surgical task according to a preoperative or other surgical plan.

The database 130 may store information that correlates one coordinate system to another (e.g., one or more robotic coordinate systems to a patient coordinate system and/or to a navigation coordinate system). Additionally or alternatively, the information directed to coordinate system correlation may be stored in or accessed by one or more other components of the system 100 (e.g., the computing device 102, the processor 104, the memory 106, etc.). The database 130 may additionally or alternatively store, for example, one or more surgical plans (including, for example, pose information about a target and/or image information about a patient's anatomy at and/or proximate the surgical site, for use by the robot 114, the navigation system 118, and/or a user of the computing device 102 or of the system 100); one or more images useful in connection with a surgery to be completed by or with the assistance of one or more other components of the system 100; and/or any other useful information. The database 130 may be configured to provide any such information to the computing device 102 or to any other device of the system 100 or external to the system 100, whether directly or via the cloud 134. In some embodiments, the database 130 may be or comprise part of a hospital image storage system, such as a picture archiving and communication system (PACS), a health information system (HIS), and/or another system for collecting, storing, managing, and/or transmitting electronic medical records including image data.

The cloud 134 may be or represent the Internet or any other wide area network. The computing device 102 may be connected to the cloud 134 via the communication interface 108, using a wired connection, a wireless connection, or both. In some embodiments, the computing device 102 may communicate with the database 130 and/or an external device (e.g., a computing device) via the cloud 134.

The system 100 or similar systems may be used, for example, to carry out one or more aspects of the method 400 described herein, or any other method. The system 100 or similar systems may also be used for other purposes.

Figure 2A:
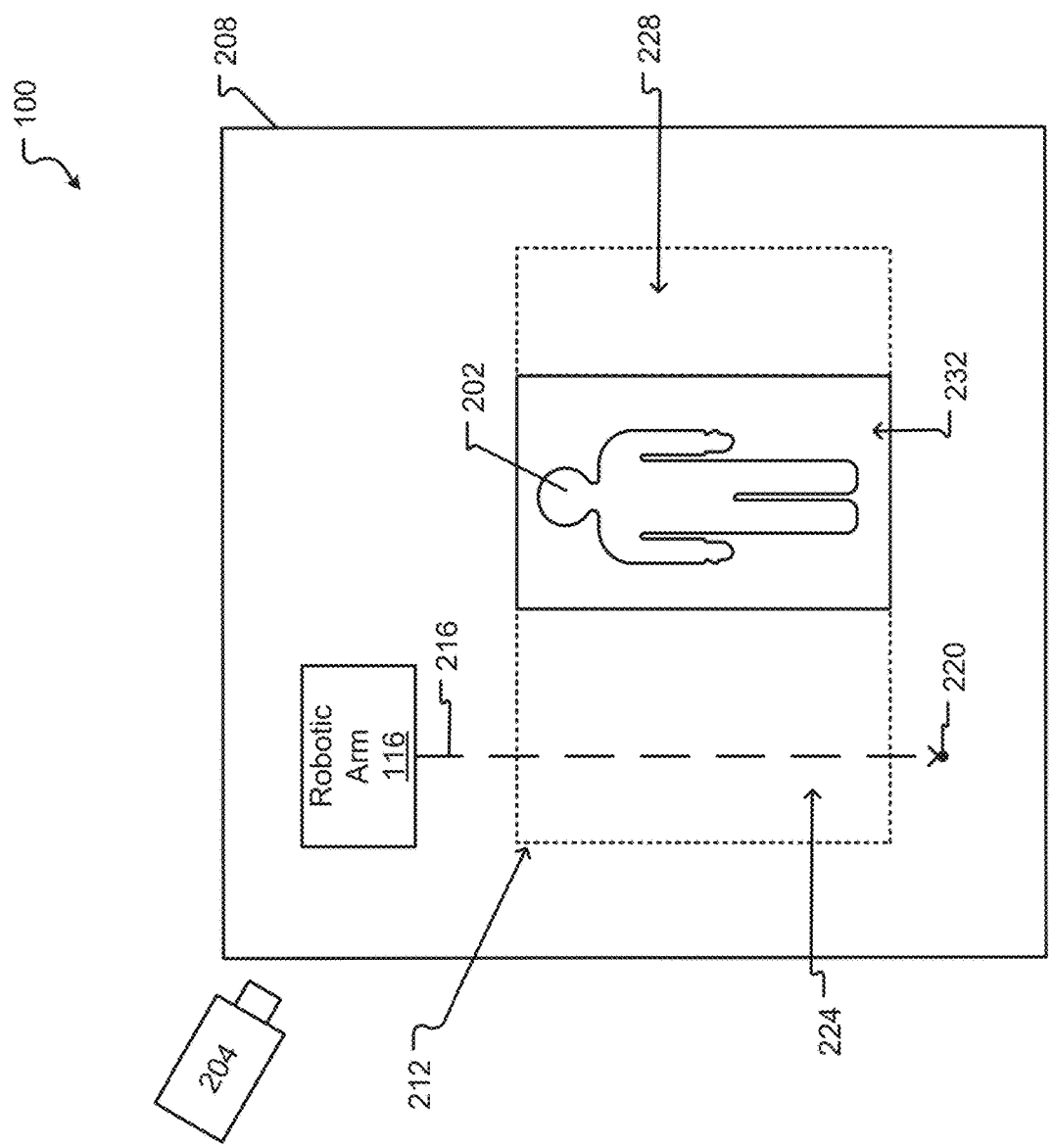
FIG. 2A is a diagram showing a movement of a robotic arm through a working volume in accordance with at least one embodiment of the present disclosure.
Figure 2B:
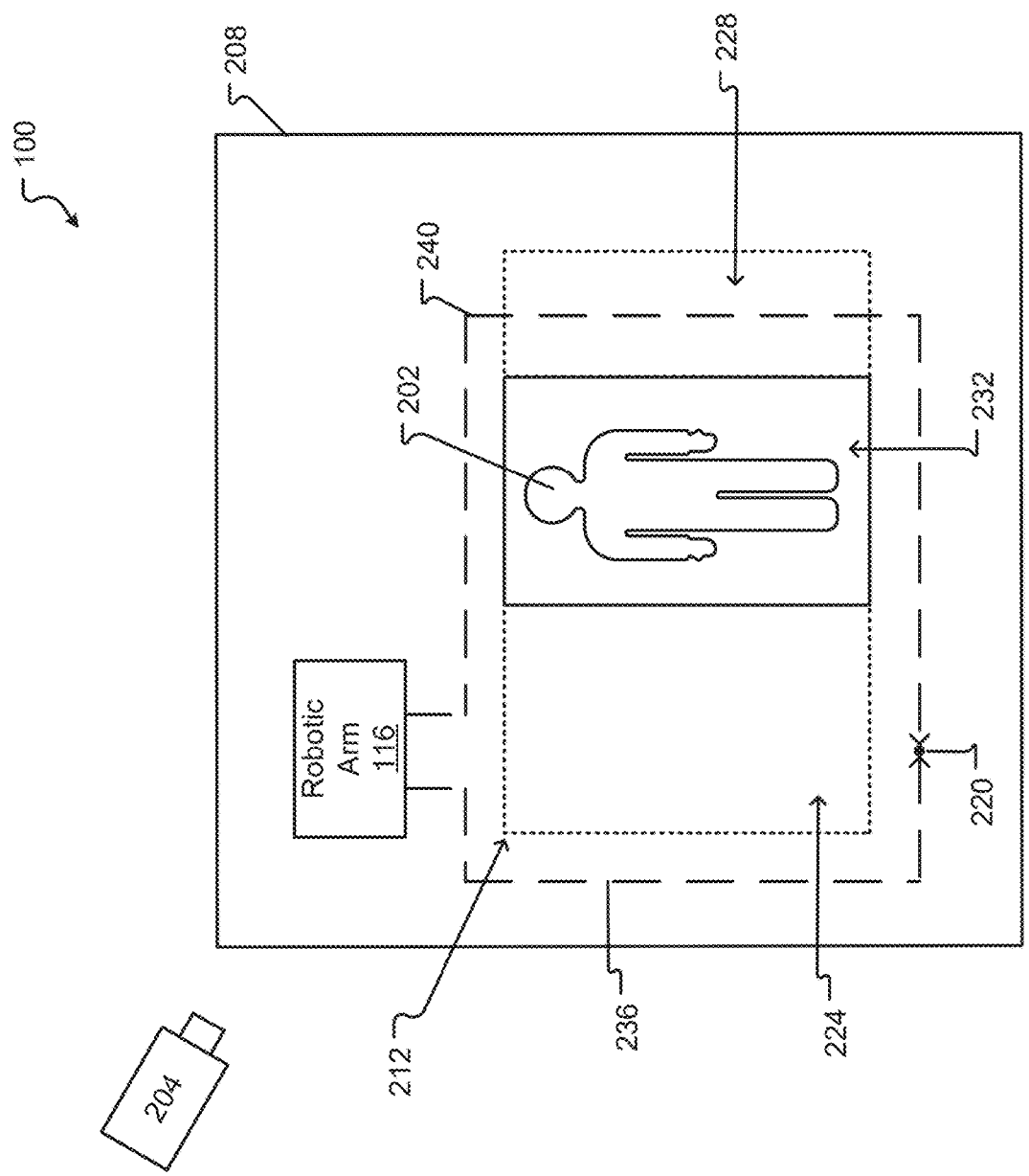
FIG. 2B is a diagram depicting a movement of a robotic arm through a working volume in accordance with at least one embodiment of the present disclosure.

FIGS. 2A-2B depict aspects of the system 100 in accordance with at least one embodiment of the present disclosure. In some embodiments, the system 100 may determine a working volume 208 associated with a surgery or surgical procedure, perform dynamic collision avoidance, and/or facilitate predictions in movement of a user 202 (e.g., a surgeon, a patient, a surgical staff member, etc.).

The system 100 may comprise a depth sensor 204. The depth sensor 204 may be or comprise components similar to the imaging devices 112 and, in some embodiments, may be used to capture one or more images of and/or track movements associated with the user 202 and a robotic arm 116. For instance, as depicted in FIG. 2A, the depth sensor 204 views and captures one or more images of both the user 202 and the robotic arm 116. As previously noted, the depth sensor 204 may additionally or alternatively track the movement of the user 202 (e.g., using kinetic models of the joints of the user 202), and generate information associated therewith. The tracked user movement and the image information related to the robotic arm 116 may both be sent to one or more other components of the system 100 (e.g., the computing device 102, the navigation system 118, the database 130, etc.).

In some embodiments, the depth sensor 204 may comprise one or more components of the computing device 102. In some embodiments, the depth sensor 204 may be coupled with the navigation system 118, such that image information flowing from the depth sensor 204 related to the movement of the user 202 and/or images related to the position and/or movement of the robotic arm 116 may be fed into the navigation system 118. In some embodiments, the depth sensor 204 may track the position and/or movement of the user 202, while an additional imaging device (e.g., the imaging device 112) may capture images of the robotic arm 116. The navigation system 118 may process the information generated by the depth sensor 204 (and any other imaging device in the system) and use the processed information to cause the robotic arm 116 to move in such a way as to avoid collisions with the user 202 or with other objects or components in proximity of the robotic arm 116.

The system 100 configured to define the working volume 208. In some embodiments, the working volume 208 is predefined (e.g., by a surgical plan). In other embodiments, the working volume 208 may be defined based on information generated by the depth sensor 204. For instance, the system 100 may define the working volume 208 based on the relative positions of the robotic arm 116, the user 202, and/or one or more other objects proximate the robotic arm 116 and/or the user 202 (e.g., other surgical components or tools, stands, tool trays, walls of an operating room, patient tables, patient anatomy, etc.). As shown in FIG. 2A, the working volume 208 may be defined as a volume encompassing the robotic arm 116 and the user 202. Additionally or alternatively, the working volume 208 may comprise only one of either the robotic arm 116 or the user 202. In some embodiments, the working volume 208 may comprise neither the robotic arm 116 nor the user 202 (e.g., the working volume 208 may be defined around a patient's anatomy, such that the robotic arm 116 and the user 202 are both outside of the working volume 208).

The robotic arm 116 may be configured to traverse a first navigation path 216 from a first position to an end position 220. The robotic arm 116 may be caused (e.g., by a computing device 102, by a processor 104, by a navigation system 118, etc.) to traverse from the start position to the end position 220 for a variety of reasons. For instance, user 202 may determine that the robotic arm 116 may be better used at the end position 220, and may use the user interface 110 to cause the robotic arm 116 to move; the robotic arm 116 may be programmed to move from the start position to the end position 220 after a predetermined amount of time or based on a current step in a surgery or surgical procedure (e.g., the robotic arm 116 is needed to move to the end position 220 to begin operating a surgical tool during a drilling step in the surgery); the robotic arm 116 may move along the first navigation path 216 to make room for additional components at the first position (e.g., a surgeon moves to place a surgical tool at the first position occupied by the robotic arm 116); and/or for any other reason. It is to be understood that while the terms "start" and "end" are used here to describe the movement of the robotic arm 116 along the first navigation path 216, the robotic arm 116 is not restricted to a singular movement along a single navigation path in this context. Indeed, the robotic arm 116 may move multiple times in the duration of the surgery or surgical procedure along multiple different navigation paths from multiple different start points to multiple different end points for various reasons. Furthermore, while examples are provided in relation to a single robotic arm 116, it is to be understood from the embodiments of the present disclosure that multiple robotic arms may be moved, and subsequent navigation paths adjusted. Additionally, while discussion herein is directed to the navigation system 118 dynamically updating the navigation paths of the robotic arm 116, navigation paths associated with additional or alternative components (e.g., different robotic arms, imaging equipment such as an imaging source and/or imaging detector, surgical tools connected to navigated components, etc.) may be calculated and dynamically updated by the navigation system 118 using methods and techniques discussed herein.

Before or during the movement of the robotic arm 116 along the first navigation path 216, the depth sensor 204 (and/or one or more components thereof) may capture one or more images of the surgical environment (such as images of the working volume 208, the robotic arm 116, and/or the user 202), and/or other information associated with the relative positioning of the robotic arm 116 and/or the user 202 (e.g., kinetic skeleton tracking of one or more joints of the user 202). The system 100 may process the information (e.g., via the processor 104) received from the depth sensor 204 to determine the poses of the robotic arm 116 and/or the user 202. For instance, the system 100 may use the one or more images of the surgical environment (which may be captured, for example, by the imaging device 112) to determine the pose of the robotic arm, and the system 100 may use the information associated with the relative position and/or movement of the user 202 (which may be captured, for example, by the depth sensor 204) to determine a pose of the user 202.

Based on the pose of the robotic arm 116 and/or the position of the user 202, the system 100 may construct a 3D map 212. The 3D map 212 may provide one or more sub-volumes that define probabilities associated with predicted motions of the user 202 (or, additionally or alternatively, the predicted motion of other objects or individuals). For example, each sub-volume may have an associated probability, with the probability reflecting the predicted chance that the space will be occupied by the user 202 in the future or near future (e.g., 10 milliseconds (ms), 100 ms, 200 ms, 500 ms, 1 second(s), 2s, 3s, 5s, 10s, etc. from the time the pose of the robotic arm 116 and/or the user 202 was determined). The 3D map 212 may comprise one or more high probability zones 224, one or more low probability zones 228, and/or a no fly zone 232. The high probability zone 224 may correspond to a volume that the system 100 has determined has a high chance of being occupied by the user 202 in the future or near future, while the low probability zone 228 may be a volume that the depth sensor 204 has determined is unlikely to be occupied by the user 202 in the future or near future.

In some embodiments, the high probability zone 224 and/or the low probability zone 228 may be based on the one or more images and/or the other information collected by the depth sensor 204. For instance, the user 202 may be walking in a first direction and the navigation system 118 may determine that the user 202 is walking in the first direction based on the information captured by the depth sensor 204, that there is a high likelihood that the user will continue walking in the first direction, and that the volume in front of the user 202 along the first direction is or comprises a high probability zone. Similarly, since the user 202 is walking in the first direction, the navigation system 118 may determine that the volume behind the user 202 (i.e., the volume in the "negative" first direction) may correspond to a low probability zone (since the navigation system 118 may determine that it is unlikely that the user 202 turns around and walks back in the opposite direction).

The high probability zone 224 and/or low probability zone 228 may be defined in the 3D map 212 based on not only the information captured by the depth sensor 204 (or other imaging components of the system 100), but additionally or alternatively based on a variety of parameters. For instance, the system 100 may take into account the type of surgery (e.g., a spinal surgery may define high probability zones around a working volume proximate to or encompassing the spine of a patient); the type of surgeon (e.g., an orthopedic surgeon may move differently and/or may move more frequently than an anesthesiologist); the type of surgical procedure (e.g., a surgical procedure on a single vertebra may involve less movement of the surgeon than a surgical procedure involving multiple vertebrae); a time of day (e.g., during morning surgeries, a surgeon may move more often and more quickly than surgeries later in the day); a patient position (e.g., a patient in the prone position may move less than a patient in a standing position); information associated with the patient (e.g., gender, height, weight, etc.); a surgical room (e.g., larger surgical rooms may permit for greater range of movement of the surgeon and/or the robotic arm); a surgical team (e.g., the number and type of surgeons or other surgical staff may result in increased user movement and additional high traffic areas); a duration of a surgery (e.g., a longer surgery may require movement of the surgeon more often than a shorter surgery); combinations thereof; and/or the like. In some embodiments, the system 100 may use one or more prediction algorithms (e.g., prediction algorithms 122) that may be, comprise, or implement machine learning algorithms (e.g., a classifier, a Support Vector Machine (SVM), etc.) trained on historical data related to the above-mentioned parameters (e.g., data from previous surgeries, data tied to the specific surgeon or surgical team, etc.) to predict the movement of the user 202 and generate the 3D map 212 based thereon.

Based on the definition of the 3D map 212, the navigation system 118 (or components thereof such as the computing device 102) may cause the robotic arm 116 to move along a different navigation path in order to, for example, avoid the high probability zone 224. The navigation system 118 may determine that a collision is likely to occur if the robotic arm 116 were to continue navigation along the first navigation path 216 (due to first navigation path 216 crossing through the high probability zone 224 of the 3D map 212) and may calculate a different navigation route for the robotic arm 116 to traverse, such as a second navigation path 236 or a third navigation path 240. The determination of the navigation path for the robotic arm 116 may be determined along any part of the first navigation path 216 and may be calculated in real time or near real time based on changes in movement associated with the user 202.

Additionally or alternatively, the navigation system 118 may cause the speed of the robotic arm 116 to be adjusted based on the 3D map 212. In some embodiments, the navigation system 118 may determine that the movement of the robotic arm 116 through along the first navigation path 216 should be slowed down or sped up, based on the movement of the user 202 and/or safety rules defined by the system 100. For instance, the navigation system 118 may cause the movement of the robotic arm 116 to speed up (such that the robotic arm 116 passes through the high probability zone 224 in which collision is likely before the user 202 enters the high probability zone 224) or slow down (such that the robotic arm 116 continues on the first navigation path 216 at a slower speed so as to permit the user to pass through the high probability zone 224 before the robotic arm 116 enters the high probability zone 224) while navigating along the first navigation path 216 to reduce the chance of collision between the user 202 and the robotic arm 116. In some embodiments, the navigation system 118 may adjust the movement speed of the robotic arm 116 only when the robotic arm 116 is inside of or near the high probability zone 224, such as when the robotic arm 116 is within a threshold distance of the high probability zone 224 (e.g., within 5 meters (m), within 2m, within 1 m, within 0.5m, within 0.2m, within 0.1m, etc. of the high probability zone 224).

In some embodiments, the navigation system 118 may detect when the user 202 moves into or out of one or more of the high probability zone 224 and the low probability zone 228, and the system 100 may redefine or recreate the 3D map 212 based on the movement of the user 202. For example, the user 202 may enter the high probability zone 224, and the depth sensor 204 may capture information related to the movement of the user 202, with the information being relayed to the system 100 (and/or components thereof). The system 100 may then update the 3D map 212 (e.g., the high probability zone 224 may be redefined as a no fly zone 232, the area the user 202 left when entering the high probability zone 224 may be redefined from a no fly zone 232 to a low probability zone 228, etc.).

In some embodiments, the determination of the alternative navigation route may be based on thresholding the probability associated with each sub-volume or zone as defined by the 3D map 212 against an established degree of risk. For instance, while both the second navigation path 236 and the third navigation path 240 avoid the high probability zone 224, the third navigation path 240 passes through the low probability zone 228, which still permits for the possibility of a collision. The navigation system 118 (or components thereof such as the computing device 102) may compare a probability associated with each zone to a threshold value and cause the robotic arm 116 to navigate different routes depending on the result of the threshold comparison. For instance, the low probability zone 228 may have an associated probability value of 12% (e.g., a 12% chance that the surgeon moves into the low probability zone 228 based on the predicted movement of the user 202). The depth sensor 204 may compare the 12% value with a threshold value (which may be predefined and/or may be retrieved from the database 130) that represents a degree of risk the system may tolerate. If the low probability zone 228 probability value falls below the threshold (e.g., the threshold value is 15%, and the probability value of the sub-volume or zone is 12%), the depth sensor 204 may permit the robotic arm 116 to traverse the third navigation path 240 and pass through the low probability zone 228. If probability value lies at or above the threshold value (e.g., the threshold value is 10%, and the probability value of the sub-volume or zone is 12%), the depth sensor 204 may omit the use of the third navigation path 240 and may cause the robotic arm 116 to move along a path that does not cross into or navigate through the low probability zone 228 (e.g., the second navigation path 236).

Alternatively, other forms of comparisons may be used by the navigation system 118 to determine the navigation route of the robotic arm 116. For example, probability ranges may be used to determine the navigation path, such as 0%-35% being defined in the "low" probability range, 36-65% as a "medium" probability range, 66%-90% being defined as a "high" probability range, and 91% and above being defined as an "extremely high" probability range. The system 100 may define the ranges through which the robotic arm 116 may navigate (e.g., low and medium probability zones may be navigated through, high and extremely high ranges may not be navigated through). In some embodiments, the system 100 may take into account the above-mentioned parameters (e.g., type of surgeon, patient positioning, the time of day, the type of surgery, duration of surgery, etc.) in defining the probability ranges and/or the rules governing the movement of the robotic arm 116 along the first navigation path 216, or any other navigation path (e.g., the navigation system 118 permits the robotic arm 116 to navigate through the low probability zone 228 for a first procedure type, but does not allow the robotic arm 116 to navigate through the low probability zone 228 for a second procedure type).

In some embodiments, the end point 220 may be the same for the second navigation path 236 and/or third navigation path 240. In other embodiments, the end position 220 may be different for one or both of the second navigation path 236 and third navigation path 240 than the end position 220 of the first navigation path 216. In some embodiments, the end position 220 may by dynamically updated based on the predicted movement of the user 202. For instance, at a first time the user 202 may move such that the navigation system 118 causes the robotic arm 116 to change from moving along the first navigation path 216 to the second navigation path 236 or to the third navigation path 240, with the end position 220 remaining the same. However, at a second time, a change in the movement and/or position of the user 202 (e.g., the user changes the direction in which he is walking, the user reaches for a tool proximate the end position 220, etc.) may be captured and processed by the depth sensor 204 (and/or one or more components therein such as the computing device 102), and the robotic arm 116 may be caused to move to a different end point than the end point 220 such that the robotic arm 116 avoids collision with the user 202 at the end position 220.

In some embodiments, the 3D map 212 may define the no fly zone 232 that may be or comprise an immediate area around the user 202 (e.g., a volume defined by a 1m distance, 0.5m distance, a 0.2m distance, a 0.1m distance, etc. from the user 202 in all directions). The navigation system 118 may cause the robotic arm 116 to move differently near the no fly zone 232 than other sub-volumes in the 3D map 212. For instance, the navigation system 118 may define the no fly zone 232 as a volume through which the robotic arm 116 may not traverse. In some embodiments, the no fly zone 232 may be a volume through which the robotic arm 116 may navigate subject to restrictions (e.g., the robotic arm 116 moves at the slowest speed setting). In some embodiments, the navigation system 118 may identify the no fly zone 232, and automatically re-route the robotic arm 116 if the navigation path traversed by the robotic arm 116 passes through the no fly zone 232. In some embodiments, the navigation system 118 may determine the no fly zone 232 and may cause the robotic arm 116 to slow down or stop navigating the navigation path if the navigation path passes through the no fly zone 232 and/or comes within a threshold distance of the no fly zone 232 (e.g., within 5m, within 2m, within 1m, etc. of the no fly zone 232).

In some embodiments, the no fly zone 232 may be modified by the navigation system 118 within the 3D map 212 based on, for example, a variety of parameters (e.g., the surgeon, the type of surgery or surgical procedure, the duration of the surgery or surgical procedure, etc.), and/or how hazardous the robotic arm 116 may be to the user 202. For example, the depth sensor 204 may capture images that show that an end effector of the robotic arm 116 is gripping a surgical tool (e.g., a drill or other object hazardous to the user), and the updated 3D map 212 may include an expanded volume of the no fly zone 232, such that the possible navigation paths the robotic arm 116 cause the robotic arm 116 to move at a further relative distance from the user 202 than with the original no fly zone 232. In another example, the depth sensor 204 may capture information indicating that the robotic arm 116 is carrying a drape (e.g., an object not hazardous to the user), and the resulting 3D map 212 as constructed by the prediction algorithms 122 may maintain the volume of the no fly zone 232 or reduce the volume of the no fly zone 232, such that the robotic arm 116 may move along navigation paths that bring the robotic arm 116 closer to the user 202 while traversing the navigation path than previously permitted.

Figure 3A:
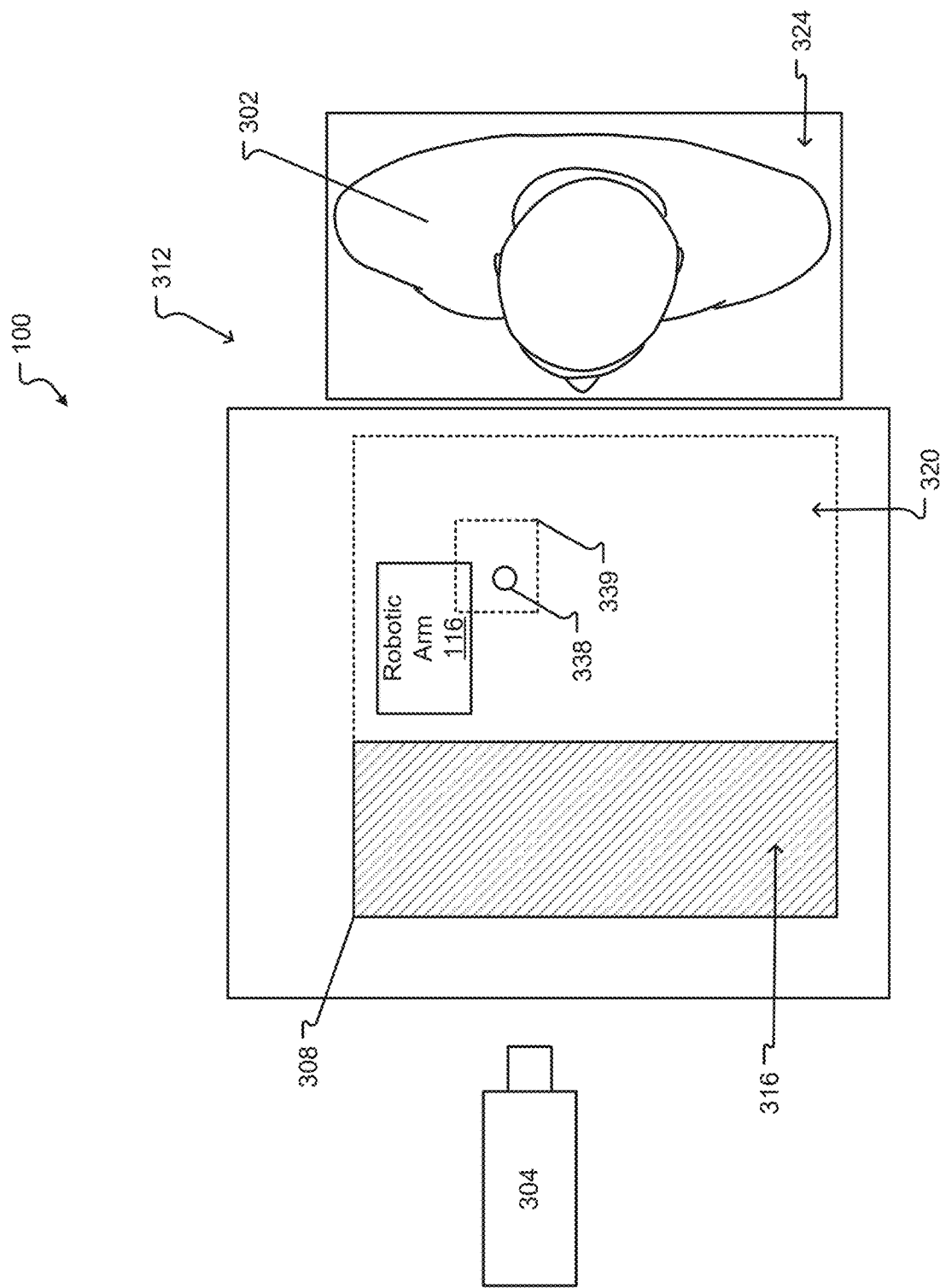
FIG. 3A is a diagram illustrating an individual and a working volume in accordance with at least one embodiment of the present disclosure.
Figure 3B:
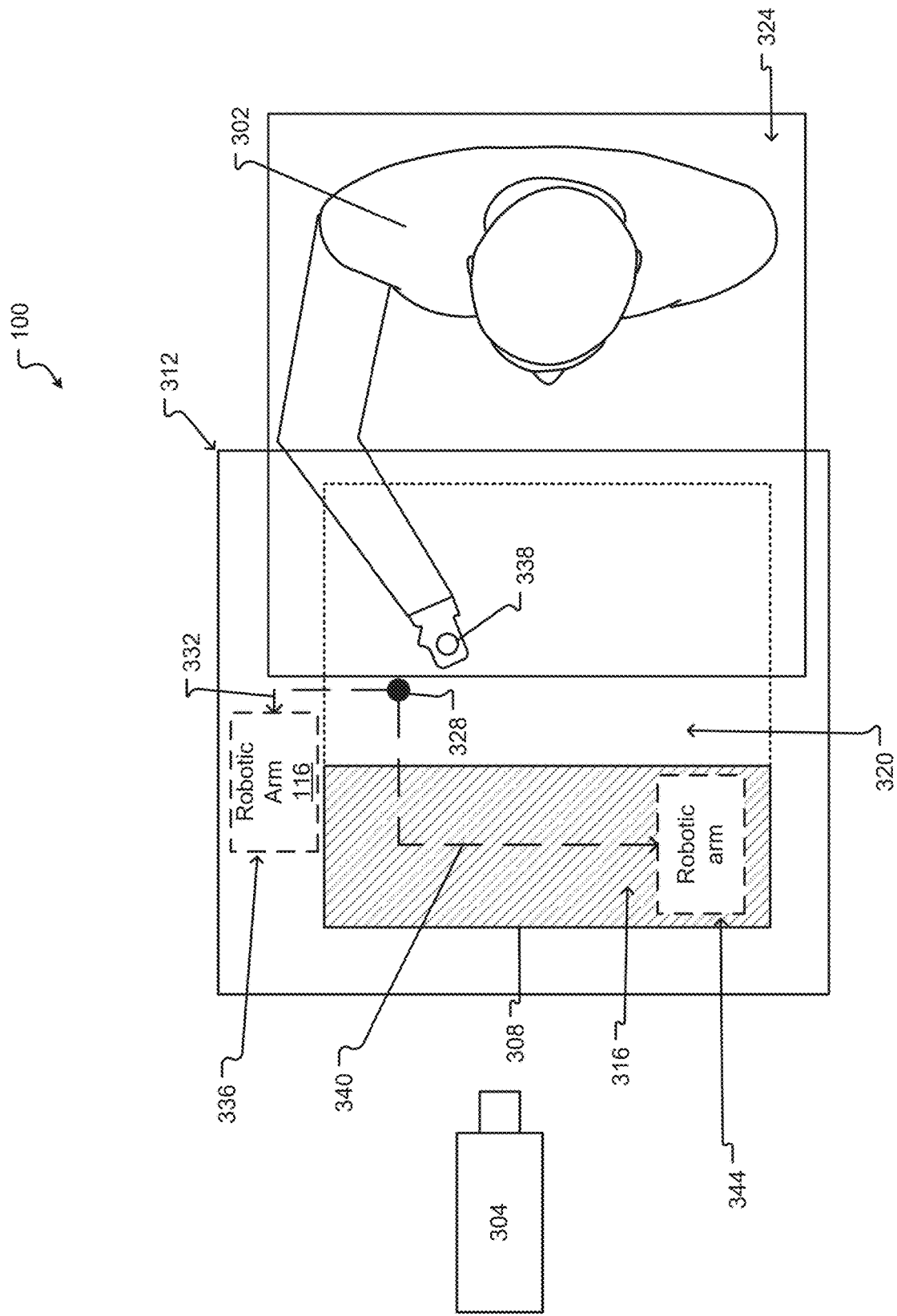
FIG. 3B is a diagram showing a movement of a robotic arm based on a user movement in accordance with at least one embodiment of the present disclosure.
Figure 3C:
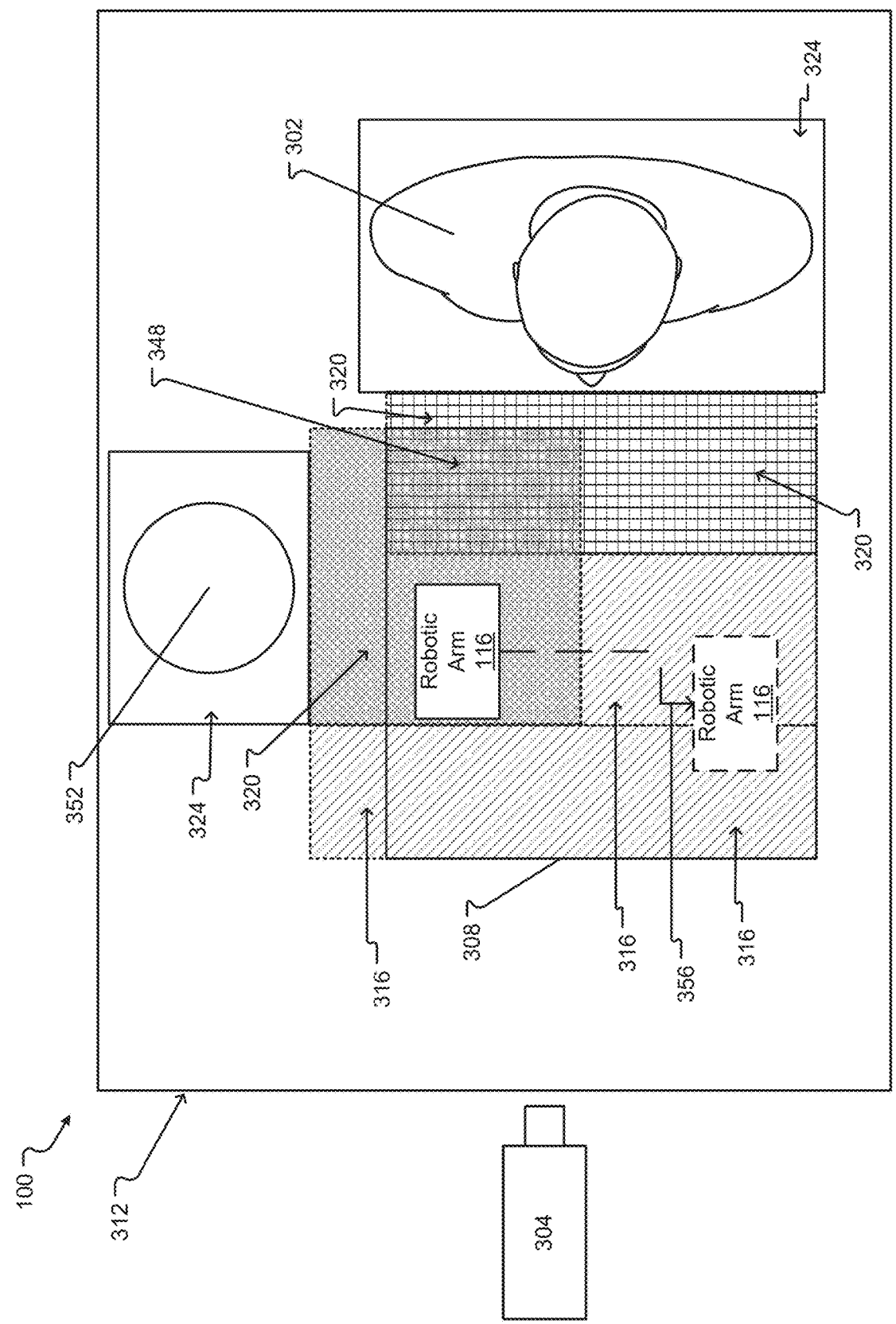
FIG. 3C is a diagram of a robotic arm in a working volume in accordance with at least one embodiment of the present disclosure.

FIGS. 3A-3C illustrate aspects of the system 100 in accordance with at least one embodiment of the present disclosure. The system 100 comprises a robotic arm 116, a user 302 (e.g., who may be similar to or the same as the user 202), and a depth sensor 304 (which may be similar to or the same as the depth sensor 204) viewing both the robotic arm 116 and the user 302.

In the illustrated aspects of FIG. 3A, the depth sensor 304 may monitor movement of the user 302 and capture information related to the pose of the robotic arm 116 during the course of a surgery or surgical procedure. In some embodiments, the depth sensor 304 may be or comprise various sensors (e.g., image sensors, depth sensors, eye trackers, heat sensors, etc.) that may provide information about the position and/or movement of the user 302, as well as sensors that capture information related to the pose of the robotic arm 116. Based on the captured information, the system 100 may generate a 3D map 312 (which may be similar to or the same as the 3D map 212) based on information gathered during the monitoring that comprises sub-volumes containing one or more probabilities of movement of the user 302. In some embodiments, the navigation system 118 may implement one or more prediction algorithms (e.g., prediction algorithms 122) that receive information from the depth sensor 304 as inputs and output the 3D map 312.

In the embodiment shown in FIG. 3A, the 3D map 312 may comprise two or more sub-volumes that are defined within a working volume 308, but additional or alternative sub-volumes may be defined in the 3D map 312 (which may include sub-volumes outside the boundaries of the working volume 308). The high probability zone 320 (which may be similar to or the same as a high probability zone 224) may be an area, location, or space with which the user 302 is likely to interact as determined by the navigation system 118, while the low probability zone 316 (which may be similar to or the same as a low probability zone 228) may be an area, location, or space with which the user 302 is unlikely to interact as determined by the navigation system 118. In some embodiments, the 3D map 312 may separately define a no fly zone 324 (which may be similar to or the same as the no fly zone 232) from the working volume 308, which may specify or designate an area, location, or space where the robotic arm 116 is not permitted to navigate (or alternatively where the robotic arm 116 may navigate subject to restrictions).

Additionally or alternatively, the 3D map 312 may be or comprise a heat map. The heat map may provide visual indicia of the low probability zones 316, the high probability zones 320, the no fly zone 324, and/or the working volume 308. In some embodiments, the heat map may be rendered to a user interface (e.g., a user interface 110) to permit users (e.g., surgeons, surgical staff, etc.) to view the heat map. In some embodiments, one or more of the low probability zones 316, the high probability zones 320, the no fly zone 324, and/or the working volume 308 may provide different visual indicia, such that they can be distinguished from one another by the users in the surgical environment. For instance, the low probability zones 316 may be rendered as blue or green areas, the high probability zones 320 may be rendered as yellow or orange areas, and the no fly zone 324 may be rendered as red areas.

The navigation system 118 may use the 3D map 312 to determine an optimal navigation route and cause the robotic arm 116 to move along the navigation route. As shown in FIG. 3A, the 3D map 312 may indicate or comprise information related to an initial pose 328 of the robotic arm 116, which may indicate that the robotic arm 116 is stationary (i.e., not traversing a navigation route) within the high probability zone 320 in the working volume 308. In some embodiments, the high probability zone 320 may be a portion of the working volume 308 with which it is likely that the user 302 will enter or otherwise interact. For example, the high probability zone 320 may correspond to an area of the working volume 308 comprising a drape that the user 302 is likely to interact with during the course of a spinal surgery or procedure. In some embodiments, the 3D map 312 may define one or more predicted locations 338 within the high probability zone 320 that the user 302 has a likelihood of entering or occupying (e.g., a location of a hand of the user 302, a location of the head of the user 302, etc. at a later time once the user 302 enters the high probability zone 320). In some embodiments, the system 100 may include an error boundary 339 associated with the predicted location 338. The error boundary 339 may be a predetermined threshold surrounding the predicted location 338 such that, if the robotic arm 116 is located within the error boundary 339, the system 100 will treat the robotic arm 116 as occupying location 338 for the purposes of navigation.

The navigation system 118 may generate one or more navigation paths for the robotic arm 116 to navigate, such that the robotic arm 116 no longer occupies the predicted location 338. In some embodiments, the robotic arm 116 may be caused to move pre-emptively, such that the robotic arm 116 moves before the user 302 enters the high probability zone 320. In other embodiments, the robotic arm 116 may begin moving in real time or near real time as the user 302 enters the working volume 308 and/or the high probability zone 320, based on real time or near real time updates in the 3D map 312 based on the predicted movement of the user 302. The navigation paths for the robotic arm 116 may be generated by the navigation system 118 based on various parameters (e.g., surgery type, surgeon type, time of day, etc.) and/or safety or other constraints of the system 100. For instance, and as shown in FIG. 3B, the robotic arm 116 may take a first navigation path 332, resulting in the robotic arm 116 moving from the initial pose 328 to a first pose 336 located outside the working volume 308. The robotic arm 116 may navigate along the first navigation path 332, for example, when the system 100 determines that the robotic arm 116 may not occupy the working volume 308 at the same time the user 302 does (e.g., when the robotic arm 116 is holding a surgical tool). The system 100 may alternatively cause the robotic arm 116 to move along a second navigation path 340, which may cause the robotic arm 116 to move from an initial pose 328 to a second pose 344 located within the working volume 308 in the low probability zone 316. The navigation system 118 may cause the robotic arm 116 to move along the second navigation path 340, for example, when the robotic arm 116 may occupy the working volume 308 concurrently with the user 302, or when the robotic arm 116 is permitted to occupy the low probability zone 316.

In some embodiments, as the user 302 moves into the working volume 308, the depth sensor 304 may detect and capture information related to the motion and may provide the updated information to the system 100. The updated information may be used by the system 100 (e.g., using one or more prediction algorithms 122) to update the 3D map 312, which may include updating one or more of the sub-volumes therein. For instance, as shown in FIG. 3B, as the user 302 moves into the working volume 308, the no fly zone 324 may be updated in the 3D map 312 to extend into the working volume 308 along with the user 302. Information concerning the updated no fly zone 324 may be sent to the navigation system 118, which may update the navigation routes of the robotic arm 116 to avoid passing into the no fly zone 324 in real time or near real time.

In some embodiments, the one or more navigation algorithms may be, comprise, or implement machine learning algorithms trained on historical data that output navigation paths that facilitate beneficial operations other than causing the robotic arm 116 to avoid collisions and/or high probability zones, such as causing the robotic arm 116 to traverse navigation paths to arrive at helpful or beneficial locations. For instance, the navigation system 118 may learn, using machine learning in the navigation algorithms, that at a first time of a spinal surgery, the user 302 is likely to require additional light to be shone on an area of the spine. The navigation system 118 may, before or at the first time, automatically cause the robotic arm 116 (which may comprise an end effector gripping an illumination source) to traverse a navigation path that avoids high probability zones to arrive at the area of the spine to provide illumination. In another example, the navigation system 118 may learn that a certain surgeon frequently conducts a certain surgical procedure on a first side of the patient, and rarely moves to a second side of the patient. The navigation system 118 may generate navigation routes for the navigation system 118 that avoid navigating the robotic arm 116 along the first side of the patient and may more frequently generate navigation routes that guide the robotic arm 116 along the second side of the patient.

Turning now to FIG. 3C, aspects of the system 100 illustrate the system 100 predicting the movement of multiple objects and adjusting the movement of the robotic arm 116 in accordance with embodiments of the present disclosure. In such embodiments, the system 100 comprises an object 352. The object 352 may be another user (e.g., a member of the surgical staff, another surgeon, etc.), a surgical instrument, tool, or element attached to another robotic arm (e.g., a drill, a saw, etc.), or more generally another object in the surgical environment (e.g., a surgical tool stand, a moveable portion of a table on which the patient lies, medical imaging devices or components thereof, etc.). In some embodiments, the object 352 may be an object is not moved by actuators and is instead moved by a user (e.g., a surgical tool stand is moved by a member of the surgical staff in the surgical environment). In other embodiments, the object 352 may be functional to move without user input (e.g., another robotic arm guided by a navigation system, another robotic arm independent of the system 100 controlled by a different system, etc.). The object 352 may comprise a no fly zone 324.

The depth sensor 304 may capture images or other information (e.g., a relative distance or depth of one or more components and/or individuals within the surgical environment) and relay the captured information to one or more components of the system 100 (e.g., the computing device 102, the navigation system 118, etc.). The navigation system 118 may determine and/or define the position and/or orientation of one or more of the robotic arm 116, user 302, the object 352, and/or any other component within the surgical environment (e.g., a position of the working volume 308). In some embodiments, the navigation system 118 may implement one or more image processing algorithms (e.g., image processing algorithms 120) and/or one or more registration algorithms (e.g., registration algorithms 128) to determine the relative pose of the robotic arm 116, the user 302, and/or the object 352, and/or to register the robotic arm 116, the user 302, and/or the object 352 to one another or to a common coordinate system, respectively.

The system 100 may establish a 3D map 312. In some embodiments, the 3D map 312 may comprise a portion or the entirety of the working volume 308. The 3D map 312 may be based on the predicted movement of the user 302 and/or the object 352. In some embodiments, the system 100 may implement one or more prediction algorithms (e.g., prediction algorithms 122) to predict the movement of the user 302 and/or the object 352. In some embodiments, the 3D map 312 may be composed of two or more sub-volumes or zones contained therein, with each sub-volume or zone corresponding to a degree of likelihood (e.g., a probability) that the sub-volume or zone will be occupied (e.g., by the user 302, by the object 352, etc.). For instance, the 3D map 312 may determine that the portion of the working volume 308 directly in front of the user 302 may be a high probability zone 320, where there is a high likelihood that the user 302 enters the high probability zone 320 (e.g., the high probability zone 320 may correspond to a location in the working volume 308 where patient anatomy relevant to the surgery or surgical procedure is located, and there may be a high probability that the surgeon enters the working volume 308 to, for example, inspect the patient anatomy). Similarly, the 3D map 312 may define another high probability zone 320 where it is likely that the object 352 will move. For instance, the object 352 may be a robotic arm with an end effector gripping a saw, and the high probability zone 320 may correspond to a location where the saw must move to perform a cut on patient anatomy in the working volume 308 during a surgery or surgical procedure.

Once the 3D map 312 (and correspondingly the sub-volumes or zones within) is defined, the navigation system 118 may use the 3D map 312 to determine a navigation path for the robotic arm 116, which may be located or moving within the working volume 308. For instance, the navigation system 118 may determine based on the 3D map 312 that the robotic arm 116 is located or moving within a high probability zone 320, where collision between the robotic arm 116 and the user 302 and/or the object 352 may be likely (as compared to lower probability zones). The navigation system 118 may adjust, change, or reroute the robotic arm 116 along the navigation path, such that the robotic arm 116 moves out of the working volume 308 and/or moves to avoid the high probability zone 320. In some embodiments, the navigation system 118 may use one or more navigation algorithms (e.g., navigation algorithms 124) to adjust the navigation path. The navigation algorithms may take in as inputs the current or planned navigation path; system requirements related to tolerances and safety (e.g., zones through which the robotic arm 116 is permitted or not permitted to navigate); and/or the 3D map 312 defining probability zones. The navigation algorithms may output navigation paths that the robotic arm 116 may take to avoid collision (or to minimize the probability of collision).

The determined pose of the robotic arm 116, the user 302, and/or the object 352, as well as the 3D map 312, may be passed to the navigation system 118, which may use the poses and the probability zones to develop a navigation path for the robotic arm 116. In some embodiments, the navigation system 118 may implement or use one or more navigation algorithms (e.g., navigation algorithms 124), which may use machine learning, neural networks, and/or artificial intelligence, that receive the pose information of the robotic arm 116, the user 302, the object 352, and/or other pose information of other objects within the surgical environment, as well as the 3D map 312 indicating the likelihood of a user entering a zone or sub-volume in the 3D map 312, as an input and output a navigation path for the robotic arm 116.

In some embodiments, the navigation paths of the robotic arm 116 may avoid a high traffic zone 348. The high traffic zone 348 may be an area of overlap between multiple high probability zones 320 and/or areas where it is likely that one or more individuals or objects (e.g., the user 302 and the object 352) will enter or occupy in the future or near future. For example, the high traffic zone 348 may be a portion of patient anatomy within the working volume 308 that both the object 352 (e.g., a saw attached to a robotic arm) and the user 302 (e.g., the surgeon) have a high likelihood of occupying. In such embodiments, the navigation system 118 may generate navigation paths that avoid the high traffic zone 348. In one embodiment, the navigation system 118 may generate navigation paths that actively cause the robotic arm 116 to move away from the high traffic zone 348. For instance, the high traffic zone 348 that is in an area in the first direction relative to the robotic arm 116. The navigation system 118 may use only navigation paths along which the robotic arm 116 in the negative first direction (i.e., in the direction opposite the first direction), such that the robotic arm 116 cannot pass into the high traffic zone 348. As shown in FIG. 3C, the robotic arm 116 may be caused to move along a navigation path 356 from a first pose to a second pose and avoid passing through the high traffic zone 348. In some embodiments, the high traffic zone 348 may be partially or fully defined within the working volume 308, such that the robotic arm 116 may not traverse through the working volume 308, and must instead maneuver around or outside of the working volume 308.

Figure 4:
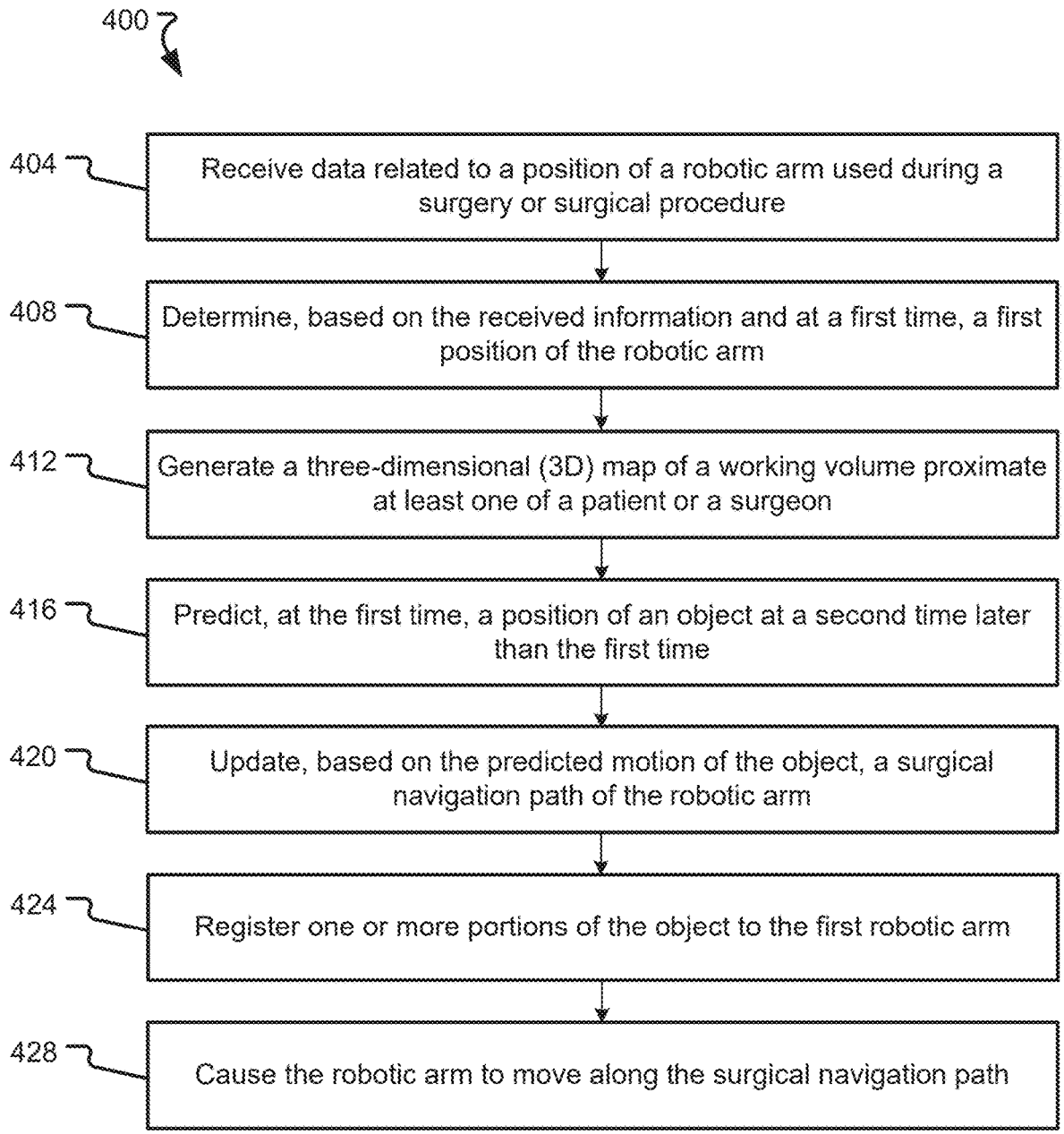
FIG. 4 is a flowchart according to at least one embodiment of the present disclosure.

FIG. 4 depicts a method 400 that may be used, for example, to identify a movement of a user (e.g., a surgeon) and adjust the movement of a robotic arm based thereon.

The method 400 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 400. The at least one processor may perform the method 400 by executing instructions stored in a memory such as the memory 106. The instructions may correspond to one or more steps of the method 400 described below. The instructions may cause the processor to execute one or more algorithms, such as an image processing algorithm 120, a prediction algorithm 122, a navigation algorithm 124, and/or a registration algorithm 128.

The method 400 comprises receiving data related to a position of a robotic arm used during a surgery or surgical procedure (step 404). The data related to the position of the robotic arm (e.g., a robotic arm 116) may be captured by a depth sensor (e.g., a depth sensor 204, a depth sensor 304, etc.), an imaging device (e.g., an imaging device 112), and/or one or more other sensors (e.g., a force gauge sensor contacting the robotic arm). In some embodiments, the robotic arm may comprise one or more tracking markers that facilitate definition of the pose of the robotic arm. For instance, the tracking markers may appear visible in captured images of the robotic arm within a surgical environment, such that the system can identify the markers and, by extension, the pose of the robotic arm. The system may make use of one or more image processing algorithms (e.g., image processing algorithms 120) that receive the image information as an input and output the pose of the robotic arm and/or one or more other components or elements within the surgical environment that also comprise tracking markers (e.g., surgical tools and tables, imaging equipment, etc.). The data related to the position of the robotic arm, the user, and/or other components or elements may be repeatedly captured by the sensors (e.g., the depth sensor) throughout the course of the surgery or surgical procedure.

The method 400 also comprises determining, based on the received information and at a first time, a first position of the robotic arm (step 408). As noted above in the step 404, the system may use one or more image processing algorithms that output the pose of the robotic arm, and additionally or alternatively the pose of one or more other components or elements within the surgical environment. The resulting pose information may be passed from the one or more image processing algorithms to one or more components of the system (e.g., a computing device such as a computing device 102, a navigation system such as a navigation system 118, etc.).

The method 400 also comprises generating a 3D map of a working volume proximate at least one of a patient or a surgeon (step 412). The 3D map (e.g., a 3D map 212, a 3D map 312, etc.) may comprise a portion or the entirety of the working volume (e.g., a working volume 208, a working volume 308, etc.). In other embodiments, the 3D map may only comprise a portion of the working volume, such that portions of the working volume are not defined by or do not overlap with the 3D map. For example, the working volume may comprise a first portion that is not included in or considered by the 3D map due to the first portion of the working volume comprising patient anatomy that is not relevant to the surgery or surgical procedure, or comprises patient anatomy that has already been addressed by the surgery or surgical procedure (e.g., a vertebra that has already been drilled into during the surgery and no longer considered by the system to be part of the surgery) and thus no longer subject to movement therearound by the user, the robotic arm, and/or other surgical tools or components within the surgical environment.

The method 400 also comprises predicting, at the first time, a position of an object at a second time later than the first time (step 416). The object may be the user (e.g., a user 202, a user 302, other surgical staff or other surgeons, etc.); another robot or robotic arm (e.g., a robot 114, a robotic arm 116, etc.) which may hold a surgical tool or other device; imaging equipment (e.g., an imaging source and/or an imaging detector); an interface (e.g., a user interface 110); components of the navigation system (e.g., mechanical arms, sensors, etc.); a different object (e.g., an object 352); combinations thereof; and/or the like. The position of the object at the first time may be determined based on, for example, image information or other information obtained by the depth sensor (or other sensors in the surgical environment, including sensors not explicitly discussed herein). The system may predict the position of the object at the second time by, for example, implementing one or more prediction algorithms (e.g., prediction algorithms 122) that may take the position of the object at the first time and determine movement of the object at the first time to predict the position of the object at the second time. In some embodiments, the prediction algorithm may access historical data (e.g., data from previous surgeries or surgical procedures) as well as other variables or parameters (e.g., type of surgery, time of day, etc.) to predict the motion of the object and the pose of the object at the second time based on similar movements in past surgeries or surgical procedures. In some embodiments, the prediction algorithm may be a machine learning model trained on the historical data, such that the prediction algorithm takes the position and/or movement of the object at the first time as an input, and predicts the movement of the object and/or the location of the object at the second time based on the trained model. In some embodiments, the prediction algorithm may define multiple areas or locations that the object may be at the second time based on the historical data and/or data based on previously conducted surgeries or surgical procedures. For example, the prediction algorithm may predict that there is a 90% probability associated with the object is at a first location at the second time, a 30% probability associated with the object is at a second location at the second time, etc.

In some embodiments, the predicting of the position of the object occurs simultaneously or in tandem with the step 412, such that the prediction is embedded within or defines the 3D map, and the system (or components thereof) can access and process the 3D map to predict the likelihood of movement of the object based on the predicted location of the object at the second time. In such embodiments, the predictions of the prediction algorithm may be used to define one or more zones or sub-volumes within the 3D map. For instance, if the prediction algorithm determines that there is a 90% chance the object is in the first location at the second time, the system may define a volume near and around the first location as a high probability zone for the purposes of re-routing the robotic arm to avoid the high probability zone.

The method 400 also comprises updating, based on the predicted motion of the object, a surgical navigation path of the robotic arm (step 420). The robotic arm may be navigated or programmed to navigate along a first surgical navigation path (e.g., a first navigation path 216) before the system predicts the motion of the object, and the system may cause the first navigation path to update to a second navigation path (e.g., a second navigation path 236, a third navigation path 240, etc.), such that the robotic arm avoids collision with or reduces the probability of collision with the object. In some embodiments, the system may cause the robotic arm to continue to navigate along the first navigation path but may cause the speed of the robotic arm to be altered (e.g., slowed down), such that any collision would occur at a lower speed.

In some embodiments, the system may adjust the surgical navigation path of the robot based on both the predicted motion of the object and an additional movement of another component (e.g., the user) based on the predicted motion of the object. For instance, the system may predict that the object may move from the first location at the first time to be at the second location at the second time, with the second location being occupied by the user at the first time (e.g., the surgeon is leaning into a first portion of the working volume to examine a vertebra of a spine, and a illumination device attached to an end effector of a robotic arm is predicted by the system to move from the first location into the first portion of the working volume at the second time). The resulting predicted movement of the surgeon (e.g., the system may predict that the surgeon has a high likelihood to pull his head back away from and out of the first portion of the working volume, resulting in the surgeon occupying a second portion of the working volume to avoid the illumination device) may be used to update the navigation path (e.g., the system may reroute the robotic arm to avoid the second portion of the working volume that the system predicts will be occupied by the surgeon, the system may cause the robotic arm to navigate through the second portion of the working volume at a slower speed, etc.).

The method 400 also comprises registering one or more portions of the object to the first robotic arm (step 424). The system may use one or more registration algorithms (e.g., registration algorithms 128) to register one or more portions of the object (e.g., portions of an end effector of a robotic arm, one or more portions of a surgeon or other surgical staff, etc.) to the robotic arm. The registration of the one or more portions of the object to the robotic arm may allow the system to determine relative movements of the robotic arm and/or the one or more portions of the object within a common coordinate system, allowing the system to identify pose(s) of the robotic arm and/or the one or more portions of the object to, for example, prevent collisions when predicting the movement and/or location of the one or more portions of the object (e.g., if the object moves from a first pose at a first time to a second pose at a second time, the system can identify coordinates associated with the object at the first time and/or coordinates associated with the object at the second time, and prevent the robotic arm from occupying or passing through those coordinates to facilitate collision avoidance). The registration algorithm may take one or more coordinates points of the robotic arm in a robotic arm coordinate system and one or more coordinate points of the one or more portions of the object in an object coordinate system as input values, and may output the coordinate points of the robotic arm in the object coordinate system (or the coordinate points of the one or more portions of the object in the robotic coordinate system). In some embodiments, the registration algorithm may output both sets of coordinates of the robotic arm and the one or more portions of the object into a single common coordinate system.

The method 400 also comprises causing the robotic arm to move along the surgical navigation path (step 428). The navigation system may cause the robotic arm to move along the surgical navigation path, and may update, change, or reroute the robotic arm traversing the navigation path, such that the robotic arm avoids high traffic areas (e.g., a high traffic zone 348) and/or zones with a high probability of user or object movement (e.g., a high probability zone 224, a high probability zone 320, etc.). In some embodiments, the navigation system may adjust the navigation path of the robotic arm in real time or near real time. For instance, the depth sensor (or other sensors) may provide a data stream of the surgical environment in real time, and the system may consistently update the pose information of the robotic arm and/or one or other objects or components within the surgical environment (e.g., the user, one or more objects, surgical tools, other devices, apparatuses, and/or equipment, etc.). Similarly, the system may continuously update the 3D map and movement predictions, such that the system can change, adjust, or update navigation paths taken by the robotic arm (or other devices or objects controlled by the system) in real time or near real time. In some embodiments, the data collection, prediction, and/or navigation of the robotic arm may occur at different time intervals (e.g., every 0.5s, every 1s, every 2s, every 5s, etc.), such that processing power is beneficially conserved.

The present disclosure encompasses embodiments of the method 400 that comprise more or fewer steps than those described above, and/or one or more steps that are different than the steps described above.

As noted above, the present disclosure encompasses methods with fewer than all of the steps identified in FIG. 4 (and the corresponding description of the method 400), as well as methods that include additional steps beyond those identified in FIG. 4 (and the corresponding description of the method 400). The present disclosure also encompasses methods that comprise one or more steps from one method described herein, and one or more steps from another method described herein. Any correlation described herein may be or comprise a registration or any other correlation.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A system, comprising:
a processor; and
a memory coupled with the processor and comprising data stored thereon that, when processed by the processor, enables the processor to:

predict, at a first time, a motion of an object from a first location to a second location during a surgical procedure at a second time following the first time;

generate a three-dimensional (3D) map of a working volume in which a surgical tool performs at least a portion of the surgical procedure and that is proximate to at least one of a patient and a surgeon, wherein the 3D map comprises a heat map with at least one sub-volume to be avoided by a robotic arm, wherein the heat map comprises at least one error boundary that is defined based on a predetermined threshold distance around the predicted second location of the object at the second time, and wherein the robotic arm is positioned within the at least one error boundary of the predicted second location; and update, based on the predicted motion of the object and the at least one error boundary, a surgical navigation path of the robotic arm, wherein the updating comprises generating a plurality of surgical navigation paths and selecting an alternative surgical navigation path of the plurality of surgical navigation paths that avoids passing through the at least one sub-volume, and wherein the alternative surgical navigation path moves the robotic arm out of the predicted second location.

2. The system of claim 1, wherein the predicted motion is based on one or more of a type of surgeon, a surgeon performing a surgery, a type of surgical procedure, a time of day, a patient position, a surgical room, and a duration of a surgery.

3. The system of claim 1, wherein the data comprises a machine learning model, and wherein the predicted motion is based on the machine learning model processing sensor input received during the surgical procedure.

4. The system of claim 1, wherein the at least one sub-volume is determined based on the predicted motion of the object.

5. The system of claim 4, wherein the at least one sub-volume comprises a high probability zone that is defined based on the predicted motion of the object.

6. The system of claim 4, wherein the surgical navigation path of the robotic arm at the first time passes through a first sub-volume of the at least one sub-volume, and wherein the updated surgical navigation path avoids passing through the first sub-volume at the second time.

7. The system of claim 1, wherein the predicted motion is based on sensor input received from at least one of an imaging sensor and a depth sensor.

8. The system of claim 1, wherein the working volume comprises an area occupied by both the surgeon and the robotic arm, and wherein the plurality of surgical navigation paths are generated based on at least one of a type of the surgical procedure and a duration of the surgical procedure.

9. A method, comprising:

receiving, from a first sensor, data comprising information related to a motion of an object at a first time away from a first position;

predicting, at the first time, a second position of an object at a second time later than the first time;

generating a three-dimensional (3D) map of a working volume in which a surgical tool performs at least a portion of a surgical procedure and that is proximate at least one of a patient and a surgeon, wherein the 3D map comprises a heat map with at least one first sub-volume to be avoided by a robotic arm and a second sub-volume that the robotic arm passes through, wherein the heat map comprises at least one error boundary that is defined based on a predetermined threshold distance around the predicted second position of the object at the second time, and wherein the robotic arm is positioned within the at least one error boundary of the predicted second position; and updating, based on the predicted motion of the object and the at least one error boundary, a surgical navigation path of the robotic arm, wherein the updating comprises generating a plurality of surgical navigation paths and selecting an alternative surgical navigation path of the plurality of surgical navigation paths that avoids passing through the at least one first sub-volume, and wherein the alternative surgical navigation path moves the robotic arm out of the predicted second position.

10. The method of claim 9, wherein the predicted motion is based on one or more of a type of surgery, a surgeon performing a surgery, a type of surgical procedure, a time of day, a patient position, a surgical room, and a duration of a surgery.

11. The method of claim 9, wherein the data comprises a machine learning model, and wherein the predicted motion of the object at the second time is based on the machine learning model processing the data from the first sensor.

12. The method of claim 9, wherein the first sub-volume is at least partially contained within the second sub-volume.

13. The method of claim 9, further comprising:

halting a movement of the robotic arm when the robotic arm is within a threshold distance of the first sub-volume.

14. The method of claim 9, wherein the first sub-volume is at least partially determined by the predicted motion of the object.

15. The method of claim 9, wherein the first sensor is at least one of an imaging sensor and a depth sensor.

16. A system, comprising:

a processor;

a first robotic arm; and a memory coupled with the processor and comprising data stored thereon that, when processed by the processor, enables the processor to:

determine, at a first time, a first position of an object during a surgical procedure;

predict, at the first time and based on the first position of the object, a second position of the object at a second time;

generate a three-dimensional (3D) map of a working volume in which a surgical tool performs at least a portion of the surgical procedure and that is proximate to at least one of a patient and a surgeon, wherein the 3D map comprises a heat map with at least one sub-volume to be avoided by the first robotic arm, wherein the heat map comprises at least one error boundary that is defined based on a predetermined threshold distance around the predicted second position of the object at the second time, and wherein the first robotic arm is positioned within the at least one error boundary of the predicted second position of the object; and update, based on the predicted second position of the object and the at least one error boundary, a surgical navigation path of the first robotic arm, wherein the updating comprises generating a plurality of surgical navigation paths and selecting an alternative surgical navigation path of the plurality of surgical navigation paths that avoids passing through the at least one sub-volume, wherein the alternative surgical navigation path moves the first robotic arm out of the predicted second position of the object.

17. The system of claim 16, wherein the data further enables the processor to:
   register one or more portions of the object to the first robotic arm.

18. The system of claim 16, wherein the at least one error boundary is further associated with the first position of the object.

* * * * *